Patented Aug. 31, 1943

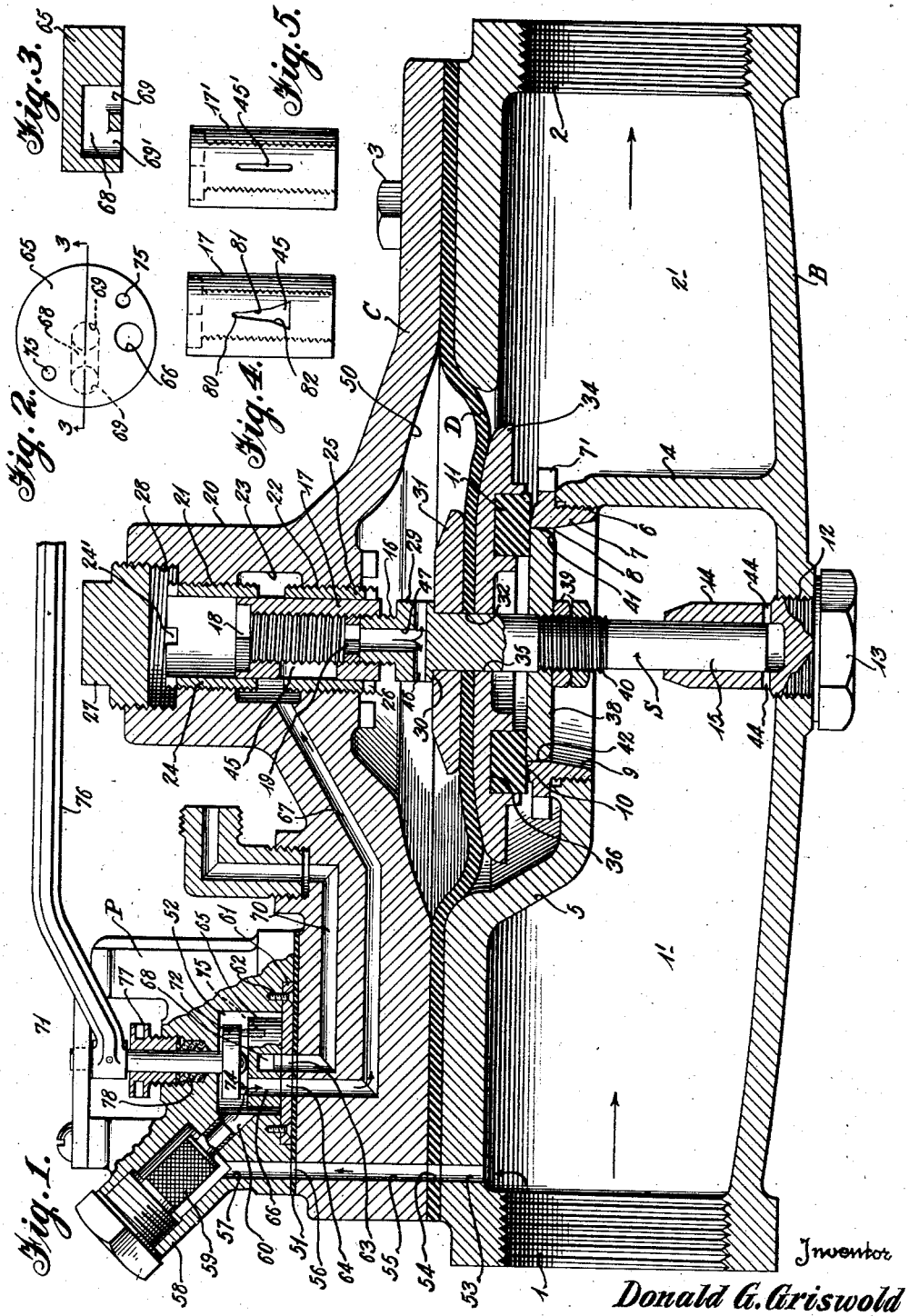
Aug. 31, 1943.　　　D. G. GRISWOLD　　　2,328,008
VALVE
Filed May 29, 1940　　　3 Sheets-Sheet 1
Inventor
Donald G. Griswold
By Bacon & Thomas
Attorneys

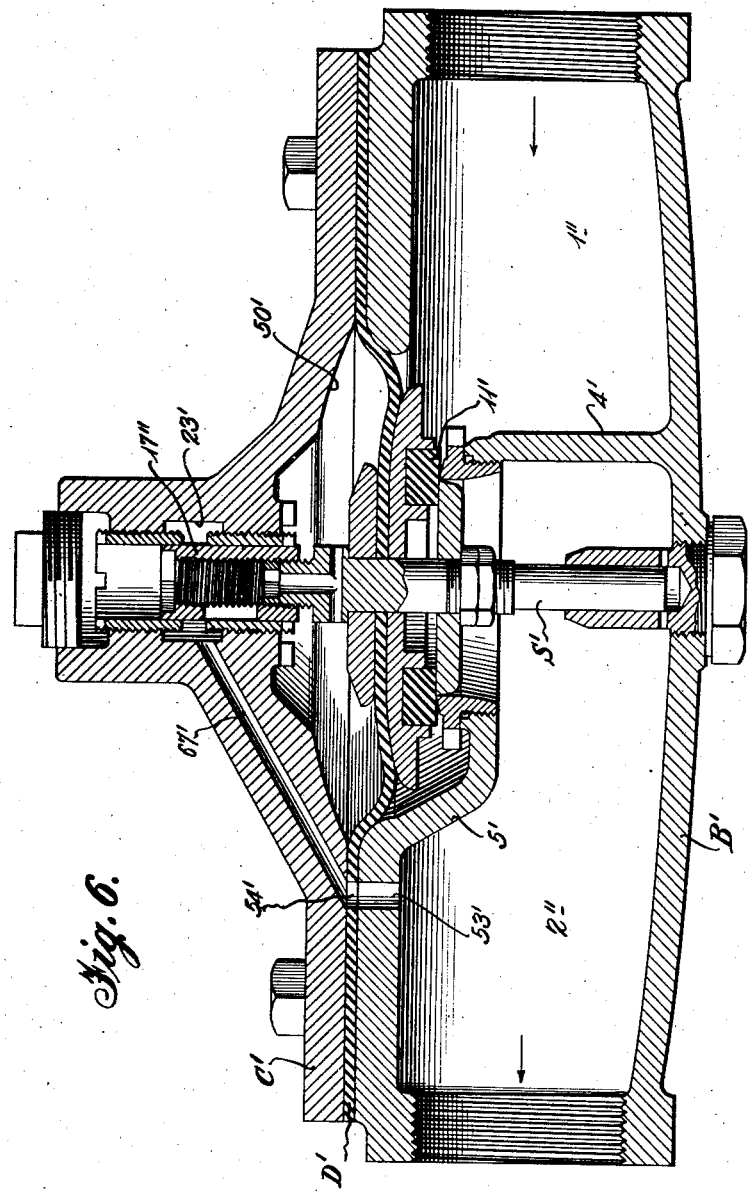

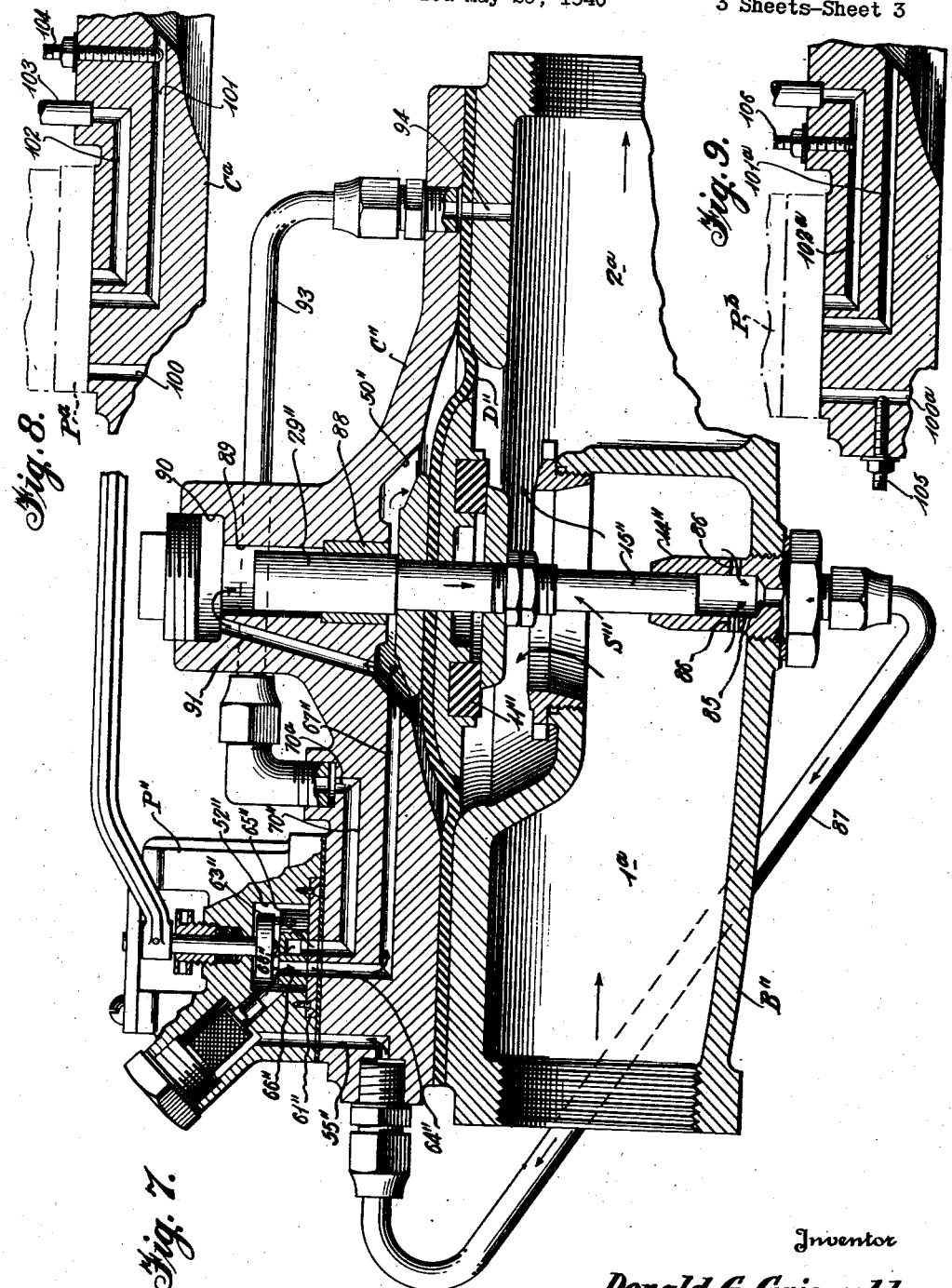

2,328,008

UNITED STATES PATENT OFFICE 2,328,008

VALVE

Donald G. Griswold, Alhambra, Calif., assignor to Clayton Manufacturing Company, Alhambra, Calif.

Application May 29, 1940, Serial No. 337,903

22 Claims. (Cl. 137—139)

The present invention relates generally to pressure responsive valves, and more specifically to pilot-controlled diaphragm valves which may be actuated either automatically or manually.

More particularly, the invention relates to a pilot-controlled valve of the diaphragm type in which the rate of opening and closing of the main valve may be varied as desired in order to effect a substantially rapid travel of the main valve disc during the major portion of its closing movement and a compartively slower travel during its final closing movement. The principles of the invention, however, are not limited to pilot-controlled valves and are obviously useful in other forms of valves, as will be apparent hereinafter.

In the operation of the conventional flow-control valve, closing is usually effected as quickly as possible and no provision is made for relieving the line shock or surge resulting from the sudden stoppage of flow by the quick closing of the valve. As a result, considerable "water hammer" occurs, which is not only objectionable from the standpoint of noise but is also objectionable because it may cause serious damage to the valve or even break the pipe line associated with the valve.

It is frequently desired to completely close a valve as quickly as possible, yet it is not practical to effect a final seal of the valve too quickly because the sudden cutting off of the flow results in hammering and line shock, as has been stated above. However, it is possible with valves constructed in accordance with the present invention to control the valve so that it will close rapidly during the major portion of its closing movement and slow down during its final closing movement. This slowing down of the closing action takes place at such rate as to gradually overcome the inertia of the fluid flowing through the valve so that no shock or hammering results. It is further possible with valves of the present construction to provide for quick opening of the valve, or to retard the rate of opening, and to vary the relative rates of opening and closing to meet specific conditions.

One of the principal objects of the invention is to provide a valve which can be operated by a very small force, irrespective of the size of the valve or the pressure of the fluid passing through the valve.

Another object of the invention is to provide a valve which utilizes the pressure in its inlet opening (or outlet opening, as the case may be) to effect closing of the valve.

Another object of the invention is to provide a valve which may be adjusted so that its closing and opening movements will occur at any desired relative rates.

Still another object of the invention is to provide a valve constructed so that it will close quickly through a major portion of its closing movement and will complete the closing movement relatively slowly; and, further, which can be reopened to its fullest extent without undue delay.

Still another object of the invention is to provide a valve arranged so that it will close at a uniform rate and open at the same, or a different, uniform rate.

A further object of the invention is to provide a valve which will close quickly through a major portion of its closing movement and which will complete the closing movement relatively slowly, but whose rate of opening movement is comparatively uncontrolled.

A still further object of the invention is to provide a pressure responsive valve in which the stem of the valve is utilized, in conjunction with suitable ports, as a means for governing or regulating the rate of flow of pressure fluid to a pressure chamber to control the opening and closing rate of the valve.

A further object of the invention is to provide a pressure responsive valve which is positive in its operation and which will not waiver or flutter between open and closed positions but which in normal operation will be either completely closed or fully open; complete closing avoiding undesirable leakage through the valve, and full opening enabling the valve to operate with maximum efficiency without restricting or impeding flow therethrough.

A still further object of the invention is to provide a pilot-controlled diaphragm valve in which the pilot may be actuated either automatically or manually, as desired.

Other and further objects of the invention will be apparent from the following description, taken in connection with the accompanying drawings, in which:

Figure 1 is a cross sectional view of a pilot-controlled diaphragm valve arranged so that the valve stem controls the rate of flow of operating fluid into and out of the pressure chamber above the diaphragm;

Figure 2 is a plan view of the pilot valve disc which controls the admission of operating fluid into, and the exhaust of operating fluid from, the pressure chamber of the main valve;

Figure 3 is a sectional view taken on the line

3—3 of Figure 2 particularly illustrating the cross sectional shape of the exhaust port of the pilot valve disc;

Figure 4 is an elevational view of one type of sleeve valve that may be associated with the stem of the valve shown in Figure 1 to effect controlled opening and closing, respectively, of the main valve at non-uniform speeds;

Figure 5 illustrates a modified form of sleeve valve adapted to provide a uniform rate of movement for the major portion of the valve disc travel during both the opening and closing of the main valve;

Figure 6 represents a valve of the type shown in Figure 1 modified so that it will function as an automatic check valve and control its own rate of opening and closing;

Figure 7 illustrates another form of valve in which it may be desirable that only the rate of closing of the valve be controlled, and in which operating fluid is conducted from the inlet chamber of the main valve to the pilot valve at a controlled rate through a tube arranged exteriorly of the valve;

Figure 8 is a view of a portion of a valve cover constructed so that the rate of flow of fluid between the pilot valve and a pressure chamber may be controlled independently of the valve stem to effect uniform opening and closing of the valve at the same rate; and Figure 9 is a view of a portion of another valve cover arranged so that the opening and closing of the main valve may be controlled independently of each other and of the valve stem.

Referring now to Figure 1 of the drawings, the letter B indicates the body of the main valve and the numerals 1 and 2, respectively, indicate the inlet and outlet sides of the valve. The letter C indicates the cover for the valve and the letter D indicates a circular diaphragm whose marginal portion is clamped between the body B and the cover C by any suitable number of cap screws 3.

The body B is provided at its outlet side with a substantially vertical partition wall 4 which cooperates with an inclined partition 5 to provide an inlet chamber 1' and an outlet chamber 2'. The wall portions 4 and 5 are merged to provide a circular opening 6 which is threaded and adapted to receive an annular valve seat 7. The valve seat 7 is provided with a circular opening 8 which flares outwardly toward the bottom of the valve body, as indicated at 9. The upper surface of the valve seat 7 adjacent the opening 8 is provided with a declining beveled portion 10 adapted to cooperate with a valve disc 11 to form a leak proof seal, as will be explained more fully hereinafter. The valve seat 7 is further provided with circumferential projections 7' adapted to be engaged by a spanner wrench for tightly securing the seat in the threaded opening 6.

The valve body B has a threaded opening 12 axially aligned with the opening 8 in the valve seat 7. An elongated plug 13 is threaded into the opening 12 and includes a tubular guide portion 14 for the lower end 15 of a valve stem S.

The upper end of the valve stem S is threaded as indicated at 16 and has a hollow, interiorly threaded sleeve 17 mounted thereon. The upper end of the sleeve valve 17 is provided with a hexagonal recess 18 adapted to be engaged by a wrench for adjustment relative to the valve stem S. A lock nut 19 having a hexagonal central opening, adapted to be engaged by a suitable wrench, is threaded into the sleeve 17 to lock the same in adjusted position on the valve stem.

The cover member C is provided with a central boss portion 20 having an upper threaded portion 21 and a lower threaded portion 22 separated by a chamber 23. A bushing 24 is mounted in the threaded portion 21 and a similar bushing 25 is mounted in the threaded portion 22. The upper end of the bushing 24 is notched as indicated at 24' to facilitate adjustment thereof in the threaded portion 21, and the bushing 25 is similarly notched at 26 to enable similar adjustment in the threaded portion 22. The bushings 24 and 25, as shown, surround the sleeve valve 17 and serve as a guide for said sleeve valve.

A plug 27 is threaded into an opening 28 in the boss 20 to facilitate inspection and adjustment of the sleeve valve parts.

The valve stem S is provided with an enlarged portion 29 adjacent the threads 16. The enlarged portion 29 terminates in a shoulder 30 which is engaged by an upper diaphragm supporting plate 31. The upper side of the diaphragm D is engaged with the lower side of the plate 31 and is provided with an aperture 32 through which the valve stem S extends. The lower side of the diaphragm D is adapted to engage the upper side of a lower diaphragm supporting plate 34, and the valve stem S extends through a central opening 35 in said plate. The lower supporting plate 34 is also provided with a channel 36 formed in the lower side thereof to receive the valve disc 11 previously referred to. A combined clamping member and choke-washer 38 is adapted to be mounted upon the stem S and to engage the inner marginal portion of the valve disc 11. Clamping nuts 39 are threaded upon a portion 40 of the valve stem S and serve to retain the valve stem, the diaphragm supporting plates 31 and 34, the valve disc 11, and the choke-washer 38 in assembled relation with the diaphragm D.

The outer diameter of the clamping member or choke-washer 38 is preferably only slightly less than that of the opening 8 in the valve seat 7. In a six inch valve, for example, the maximum radial clearance between the opening 8 and the nearest portion of the choke-washer 38 may be only three or four thousandths of an inch.

The peripheral portion of the choke-washer is preferably rounded as indicated at 41 and is tapered outwardly and upwardly from said rounded portion to substantially its upper outer edge as indicated at 42. The rounded and tapered peripheral portions of the choke-washer 38 serve to gradually cut off the flow through the opening 8, and the beveled portion 10 of the valve seat 7 cooperates with the valve disc 11 to reduce eddying and to form a theoretical line contact seal, whereby quiet, smooth and chatterless operation of the valve is obtained.

The tubular guide portion 14 for the lower end of the valve stem S is pierced by one or more transverse openings 44 provided to permit free exit of any fluid from within the guide so as not to interfere with the movement of the lower end 15 of the valve stem in said guide.

The valve sleeve 17 is provided with at least one longitudinal slot 45 arranged to cooperate with the adjacent ends of the adjustable bushings 24 and 25, as will be explained more fully hereinafter. The slot 45 extends completely through the wall of the sleeve valve, as shown in Figure 1, to establish communication between the hollow interior thereof and the surrounding chamber 23.

The upper end of the valve stem S is provided with a transverse passageway 46 and an axially extending passageway 47 which branches upwardly from the passageway 46 toward the interior of the sleeve valve 17.

The cover member C is arranged to cooperate with the diaphragm D and provide a pressure chamber 50 adapted to receive operating fluid under pressure to force the diaphragm and the valve disc 11 downwardly to effect closing of the valve.

A pilot valve generally indicated by the letter P is mounted upon the cover C in any suitable manner. A gasket 51 is clamped between the pilot valve and the cover to prevent leakage therebetween. The pilot valve contains a chamber 52 which is continuously subject to the pressure of the fluid in the inlet chamber I' of the main valve, the fluid being conducted through a passageway 53 in the body B, a passageway 54 in the diaphragm D, a passageway 55 in the cover C, an opening 56 in the gasket 51, a passage 57 in the housing 58 of the pilot valve, through a strainer 59, and thence through passageway 60 into the pressure chamber 52. The strainer 59 prevents the entrance of foreign matter into the pilot valve pressure chamber 52 with the operating fluid.

A valve seat 61 closes the lower end of the pressure chamber 52 and is secured to the pilot valve housing 58 by screws 62. The valve seat is provided with a central port 63 and a port 64 spaced a predetermined radial distance from the port 63. The gasket 51, of course, is provided with openings that register with the ports 63 and 64.

A pilot valve disc 65 seats upon the upper surface of the valve seat 61 and is provided with a through passageway 66 adapted, as shown in Figure 1, to place the pressure chamber 52 of the pilot valve in communication with the chamber 23 in the cover C through the port 64 in said valve seat and a passageway 67 in the cover C. The pilot valve disc 65 is further provided with a substantially U-shaped exhaust passageway 68, best shown in Figure 3. The exhaust passageway 68 comprises an axially arranged leg portion 69, which is always in registration with the port 63 of the valve seat 61, and another leg portion 69' which is radially spaced from the leg 69 the same distance that the port 64 of the valve seat is spaced from the port 63. The axial leg 69 of the U-shaped passageway 68 is thus always in communication with a vent passageway 70 in the cover C. The vent 70 may be arranged to exhaust into the atmosphere, as shown, or be connected by suitable fittings with the outlet side of the valve, as illustrated, for example, in Figure 7.

The pilot valve disc 65 is arranged to be turned upon its seat to effect closing and opening, respectively, of the main valve by a shaft 71 carrying a drive washer 72 at one end thereof. The drive washer 72 has a pair of pins 74 adapted to extend into blind recesses 75 drilled in the upper face of the pilot valve disc 65. A lever 76 is connected to the shaft 71 for rotating the same and moving the pilot valve disc 65 from one predetermined position to effect closing of the valve (by alignment of pilot valve disc port 66 with seat port 64, as in Figure 1) to a second predetermined position to effect opening of the valve (by registration of the exhaust port 68 with the seat ports 63 and 64).

A gland nut 77 and a packing 78 prevent leakage from the pilot valve pressure chamber 52 past the pilot valve operating shaft 71.

The slot 45 in the sleeve valve 17 may be given any desirable shape or configuration to provide the type of operation required for any given set of conditions. As shown in Figure 4, the slot 45 may consist of a narrow upper portion 80 and progressively divergent portions 81 and 82. It will be apparent that, in order for any fluid to enter or leave the pressure chamber 50 of the main valve, it must pass through the port 45 in the side of the sleeve valve 17. The rate of flow may be varied to some extent by the bushings 24 and 25, which may be adjusted upwardly or downwardly with relation to the operating stroke of the valve stem. The adjustability of the bushings 24 and 25 provides, in effect, an adjustable cooperating port for the sleeve valve, whereby it is possible to vary the effective area of registration of the port 45 of the sleeve valve with the chamber 23 as well as the portion of the stroke when fluid will pass through the sleeve valve port. It will be obvious that, as the intermediate portion 81 of the port 45 registers with the chamber 23, more fluid will flow through the port than when only the extreme upper portion 80 of said port registers with said chamber. Of course, registration of the lowermost or largest portion 82 of the port 45 with the chamber 23 will give the maximum rate of flow through said port.

Figure 5 shows an alternative sleeve valve 17' provided with a port 45' which is of uniform width throughout its length. With this type of sleeve valve, there will be no variation in the rate of flow to and from the diaphragm chamber 50 and the main valve, except during such time as the portion of the port 45' communicating with the chamber 23 is less in length than the space between the adjacent ends of the adjustable bushings 24 and 25.

Figure 1 illustrates the pilot valve disc 65 in one of its two extreme positions of adjustment; specifically, in the position for admitting pressure fluid into the chamber 50 to effect closing of the main valve. As shown, the main valve disc 11 is in its closed position. It will be noted at this point that only a portion of the port 45 is still in communication with the chamber 23. This assures continued application of pressure to the diaphragm, and provides a ready exit for the exhaust of fluid when the main valve is to be opened. However, the main valve will remain closed until the pilot valve disc 65 is rotated to allow the exhaust of the fluid from the chamber 50.

The flow of fluid from the inlet chamber I' to effect closing of the valve is as follows: fluid under pressure will enter the passage 53 in the body B and find its way to the pilot valve pressure chamber 52 through the opening 54, passageway 55, opening 56, passageway 57, strainer 59 and passage 60. Such pressure fluid will then flow through the passageway 66 in the pilot valve disc 65, through the port 64 in the valve seat 61, through the passageway 67 and into the chamber 23 surrounding the valve sleeve 17. The port 45 in the sleeve valve will control the rate of flow from the chamber 23 into the passageways 46 and 47 in the valve stem, and thence into the diaphragm pressure chamber 50.

Assuming that a sleeve valve of the type shown in Figure 4 is being used, it will be clear that, as the valve stem S begins to move downwardly, the rate of flow to the pressure chamber 50 will progressively decrease in accordance with the angular divergence of the walls 81 and 82 defining the port 45. With this arrangement, the walls 82, in cooperation with the bushings 24 and 25, will permit closing of the main valve through a portion of its downward movement at a fairly high rate, while the walls 81 will restrict the rate somewhat and the valve will continue to close, but more slowly. The narrowest part 80 of the port will, of course, still further throttle the flow and cut down the rate of closing considerably so that no surge or "water hammer" can occur.

The opening of the valve is accomplished by positioning the pilot valve disc 65 in its other extreme position of travel, namely, with the U-shaped passageway 68 positioned so that it registers with the ports 63 and 64 in the valve seat 61. The flow of fluid from the diaphragm chamber 50 will then, of course, be reversed and the main valve will open at the reverse rate; that is, the valve will begin to open slowly and its rate of opening will progressively increase as the portions 81 and 82 of the port 45 register with the chamber 23. Fluid from the chamber 23 will exhaust through the passageway 67 in the cover C into the U-shaped passageway 68 in the pilot valve disc 65 to be ultimately discharged into the atmosphere through the vent passageway 70. Or, as has been pointed out, the passageway 70 may be connected with the outlet side 2 of the valve by means such as the fitting shown in Figure 7.

It will be clear from the foregoing that a valve has been provided whose opening and closing speed may be controlled and regulated to obtain the advantages of a quick-closing valve without the usual disadvantages of hammering and line shock.

Figure 6 illustrates a valve of the type shown in Figure 1 adapted to operate as a self-governing, automatic check valve. The pilot valve P has been dispensed with and the body and the cover have been slightly altered.

One of the principal things to note in the check valve construction is that the direction of flow through the valve is now reversed. Thus, a wall 4' now defines the inlet chamber 1" and a wall 5' cooperates with the wall 4' to form the outlet chamber 2". The inlet and outlet chambers are so arranged that the valve disc 11' is required to move in a direction opposite to that of any attempted return flow of fluid in order to close the valve. This is important because, in the conventional check valve, the valve disc or closing member travels in the same direction as the back surge and is caused to slam hard against its seat by said back surge, thereby suddenly stopping the return flow and causing hammering and line shock.

The check valve of Figure 6 is arranged so that it will automatically open whenever the pressure in the inlet chamber 1" exceeds that in the outlet chamber 2", and so that it will close automatically whenever these pressure conditions are reversed. As shown, the outlet chamber 2" communicates with the chamber 23' through a passageway 53' in the body B', an opening 54' in the gasket D', and a passageway 67' in the cover C'. The valve stem S' and its associated sleeve valve 17" are arranged to control the rate of flow of operating fluid into and out of the pressure chamber 50' in the same manner as the valve stem S and sleeve valve 17 already described.

Figure 7 illustrates a simpler form of pilot-controlled valve than that shown in Figure 1. However, the valve stem S" is utilized, but in a different way, to control the rate of closing by governing the rate of flow of operating fluid from the inlet chamber 1ª to the pressure chamber 50" in the main valve. The valve stem S" is not arranged to regulate the opening rate of the main valve and thus provides for quick and unrestrained opening. However, the opening rate of the valve may be controlled, when desired, by means which will be referred to hereinafter.

The body B" of the valve shown in Figure 7 is substantially similar to the body of the valve shown in Figure 1 and, therefore, need not be described in great detail. However, the guide 14" has been modified to the extent that a comparatively restricted port 85 is provided in addition to relatively large transverse ports 86. These ports are adapted to cooperate with the lower end 15" of the valve S" so that the flow of fluid from the inlet chamber 1ª will be at a fairly rapid rate until the valve stem is moved downwardly to a position where the main valve is nearly closed and the lower end 15" of the valve stem obstructs the ports 86. Thereafter, fluid can continue to flow from the inlet chamber at a reduced rate through the restricted port 85 to effect final closing of the valve at a slower rate. The fluid which passes through the guide 14" enters a tube 87 and is conducted to a passageway 55" corresponding to the passageway 55 of the valve shown in Figure 1. Thus, the operating fluid is conducted from the inlet chamber 1ª of the main valve to the pilot valve P" by a conduit exterior of the main valve, but its rate of flow to the pilot valve is definitely controlled by the valve stem itself.

The upper end 29" of the valve stem S" is made plain and is guided by a bushing 88 in the cover C". The end 29" of the valve stem extends into a chamber 89 which merges into a relatively larger chamber 90. The chamber 90 is connected by a passageway 91 with a diaphragm chamber 50". A passageway 67" in the cover C" establishes communication between the pressure chamber 52" of the pilot valve and the diaphragm chamber 50". A vent passageway 70" in the cover C" is connected by suitable tubing 93 with a passageway 94 opening into the outlet chamber 2ª of the valve.

Figure 7 illustrates the diaphragm and its associated parts in the position which they assume shortly after the valve has started to close. At this time, fluid from the inlet chamber 1ª will flow through the ports 86 in the guide 14", through the tube 87 and the passageway 55" and thence into the pressure chamber 52" of the pilot valve. The port 66" of the pilot valve disc 65" is shown in position to admit fluid under pressure from the pilot valve P" to the diaphragm pressure chamber 50", through the seat port 64" and the passageway 67". This fluid acts downwardly upon the diaphragm D", causing the same to move the main valve disc 11" toward its seat at a fairly rapid rate. However, when the main valve disc 11" approaches its seat, the end 15" of the valve stem S" will have obstructed the ports 86 and the flow of pressure fluid to the pilot valve will then be restricted by the port 85 and the remaining movement of the main valve disc toward its seat will take place at a relatively much slower rate.

In order to open the valve, the pilot valve disc 65" must be rotated manually or otherwise so that the U-shaped exhaust passageway 68" of the pilot valve disc registers with the ports 63" and 64" in the valve seat 61", whereupon the fluid in the diaphragm chamber 50″ will be permitted to exhaust through the passageway 67″, vent 70″, the tube 93, the passageway 94, and thence into the outlet chamber 2ª of the main valve. The exhausting of the fluid from the chamber 50″ permits the pressure of the fluid in the inlet chamber 1ª to lift the main valve disc 11″ from its seat and thus force the diaphragm D″ upwardly, expelling the fluid from the chamber 50″. Inasmuch as the pilot valve disc, during the exhaust, prevents communication between the pressure chamber 52″ of the pilot valve and the diaphragm chamber 50″, no fluid can back up through the tube 87.

Thus, while the closing of the valve is controlled to occur at different rates, the opening movement is unretarded except for such negligible frictional resistance to the exhaust of the fluid as is offered by the various passageways between the diaphragm chamber 50″ and the outlet chamber 2ª. If it should be desired to restrict the opening of the valve to a given rate, vent passageway 70″, for example, might be made of such size, as indicated by the dotted lines at 70ª, as to restrict the flow of exhaust fluid to a given rate so that the valve will then open only at a corresponding rate. Again, a conventional flow bean or a conventional needle valve (not shown) may be inserted at any convenient point in the exhaust passageways.

Figure 8 illustrates a comparatively simple arrangement in which a cover Cª is constructed to cooperate with a pilot valve Pª to control the closing and opening operation of a main valve at such uniform rate as may be desired. Here, pressure fluid may be introduced into the pilot valve Pª through a passage 100 connected directly to the main valve inlet chamber or to another convenient source of pressure.

The cover Cª contains passages 101 and 102 corresponding to the passageways 67″ and 70″, respectively, of the valve shown in Figure 7. A vent tube 103 communicates with the passage 102 for draining spent operating fluid. It will be readily understood in the light of what has already been stated that operating fluid under pressure will pass through the passageway 101 on its way to the pressure chamber of a main valve to close the valve, and that this same fluid must return through said passageway to exhaust and allow opening of the main valve. Hence, by mounting an adjustable needle valve 104 so that one end projects into the passageway 101, the rate of flow of operating fluid may be varied as desired to allow the main valve to open and close at the same uniform rate of speed.

Figure 9 illustrates another cover arrangement whereby the closing rate of the main valve can be controlled by a needle valve 105 regulating the rate of flow of pressure fluid to the pilot valve Pᵇ through a passageway 100ª, and the opening rate can be independently controlled by a needle valve 106 regulating the rate of exhaust through a vent passage 102ª. A passage 101ª serves, of course, as a two-way conduit between the pilot valve and the pressure chamber of a main valve.

Valves made in accordance with Figures 8 and 9 do not, of course, require any control of operating fluid by the valve stem.

It will be understood that the principles of the invention may be embodied in valves different from those illustrated herein without departing from the spirit of the invention or the scope of the appended claims.

I claim:
1. A valve comprising: a body having an inlet opening, an outlet opening, and a seat between said openings; a diaphragm cooperable with said seat to control flow from said inlet opening to said outlet opening; a pressure chamber above said diaphragm; passage means for conducting operating fluid to and from said pressure chamber; and valve means between said passage means and said pressure chamber, said valve means being connected with said diaphragm and arranged to control the rate of admission of operating fluid into, and the rate of exhaust of spent operating fluid from, said pressure chamber.

2. A valve comprising: a body having an inlet chamber, an outlet chamber, and a seat between said chambers; a valve stem movable relative to said seat; a diaphragm connected with said valve stem and cooperable with said seat to control flow from said inlet chamber to said outlet chamber; a pressure chamber above said diaphragm; passage means for conducting operating fluid to and from said pressure chamber; and a sleeve valve between said passage means and said pressure chamber, said sleeve valve being connected with said valve stem and having a port arranged to control the rate of admission of operating fluid into, and the rate of exhaust of spent operating fluid from, said pressure chamber.

3. A valve as defined in claim 2, in which the port in the sleeve valve is elongated and of substantially uniform width for its full length.

4. A valve as defined in claim 2, in which the port in the sleeve valve is elongated and of greater width at one end than at its opposite end.

5. A valve comprising: a body having an inlet chamber, an outlet chamber, and a seat between said chambers; a valve stem movable relative to said seat; a diaphragm connected with said valve stem and cooperable with said seat to control flow from said inlet chamber to said outlet chamber; a pressure chamber above said diaphragm; passage means for conducting operating fluid to and from said pressure chamber; a sleeve valve between said passage means and said pressure chamber, said sleeve valve being connected with said valve stem and having an elongated port arranged to control the rate of admission of operating fluid into, and the rate of exhaust of spent operating fluid from, said pressure chamber; and means surrounding said sleeve valve, said means being adjustable longitudinally with respect to said sleeve valve and the port thereof.

6. A valve comprising: a body having an inlet chamber and an outlet chamber; valve means for controlling the flow from said inlet chamber to said outlet chamber; a diaphragm and a valve stem operatively connected with said valve means; a pressure chamber above said diaphragm; conduit means for conducting operating fluid to said pressure chamber; and a sleeve valve between said conduit means and said pressure chamber connected to the upper end of said valve stem, said sleeve valve having a port extending therethrough and said valve stem having passage means communicating with the interior of said sleeve valve and said pressure chamber.

7. A valve comprising: a body having a valve seat; valve means adapted to engage said seat; a valve stem connected with said valve means; a diaphragm connected with said valve stem; a pressure chamber above said diaphragm; a sleeve valve connected to the upper end of said valve stem; passage means for conducting operating fluid to said pressure chamber, said sleeve valve having a port for controlling the rate of flow of operating fluid from said passage means into said pressure chamber.

8. A valve comprising: a body having an inlet chamber, an outlet chamber, and a seat between said chambers; a valve stem movable relative to said seat; a diaphragm connected with said valve stem and cooperable with said seat to control flow from said inlet chamber to said outlet chamber; a pressure chamber above said diaphragm; passage means for conducting operating fluid to and from said pressure chamber; a valve between said passage means and said pressure chamber, said valve being connected with said valve stem and arranged to control the rate of admission of operating fluid into, and the rate of exhaust of spent operating fluid from, said pressure chamber.

9. A valve comprising: a body having an inlet chamber and an outlet chamber; valve means for controlling the flow from said inlet chamber to said outlet chamber; a diaphragm and a valve stem operatively connected with said valve means; a pressure chamber above said diaphragm; a sleeve valve connected to the upper end of said valve stem, said sleeve valve having a port extending therethrough and said valve stem having passage means communicating with the interior of said sleeve valve and said pressure chamber; and adjustable means in said valve providing in effect a port cooperable with the port in said sleeve valve for varying the admission and exhaust of operating fluid through the port of said sleeve valve.

10. A valve comprising: a body having an inlet chamber, an outlet chamber, and a seat between said chambers; a diaphragm cooperable with said seat to control flow from said inlet chamber to said outlet chamber; a pressure chamber above said diaphragm; passage means for conducting operating fluid from one of said chambers to said pressure chamber; and valve means between said passage means and said pressure chamber, said valve means being connected with said diaphragm and arranged to control the rate of admission of operating fluid into, and the rate of exhaust of spent operating fluid from, said pressure chamber.

11. A valve comprising: a body having an inlet chamber, an outlet chamber, and a seat between said chambers; a valve stem movable relative to said seat; a diaphragm and a valve disc connected with said valve stem; means guiding the opposite ends of said valve stem; a pressure chamber above said diaphragm; and means operatively associated with said valve stem for controlling the rate of flow of operating fluid to said pressure chamber, said means being arranged to provide a decrease in the rate of flow of said operating fluid as said valve disc approaches the lower limit of its travel.

12. A valve comprising: a body having an inlet chamber, an outlet chamber, and a seat between said chambers; a valve stem movable relative to said seat; a diaphragm connected with said valve stem and cooperable with said seat to control flow from said inlet chamber to said outlet chamber; means guiding the opposite ends of said valve stem; a pressure chamber above said diaphragm; and means operatively associated with said valve stem arranged to control the rate of flow of operating fluid to said pressure chamber to thereby control the rate of closing of the valve.

13. A valve comprising: a body having an inlet opening and an outlet opening; valve means for controlling the flow between said openings; a diaphragm and a valve stem connected with said valve means; means guiding the opposite ends of said valve stem; a pressure chamber above said diaphragm; passage means for conducting fluid under pressure from one of said openings to said pressure chamber; and means associated with said valve stem arranged to control the flow of operating fluid to said pressure chamber, whereby to control the rate of closing of the valve.

14. In combination, a pressure responsive main valve having a pressure chamber; a pilot valve arranged to control the supply of operating fluid to said pressure chamber; means for conducting pressure fluid from an inlet chamber of said main valve to said pilot valve; and means in said main valve for automatically varying the rate of supply of said pressure fluid to the pilot valve during the closing of said main valve.

15. In combination, a main valve having a diaphragm and a pressure chamber above said diaphragm; a pilot valve for controlling the supply of operating fluid to said pressure chamber; means exterior of said main valve for conducting pressure fluid from an inlet chamber of said main valve to said pilot valve; and means in said main valve including a stem connected with said diaphragm for varying the rate of supply of said pressure fluid to said pilot valve.

16. In combination, a diaphragm operated main valve having a pressure chamber; a pilot valve for controlling the supply of operating fluid to said pressure chamber; means for conducting fluid under pressure from the inlet chamber of said main valve to said pilot valve; a valve stem in said main valve; a guide for said valve stem operatively interposed between said valve stem and said fluid conducting means, said guide having one or more large ports of a size sufficient to allow a substantial volume of flow of fluid into said fluid conducting means, said guide also being provided with a restricted port arranged to allow a lesser volume of flow when said valve stem obstructs the flow through the large ports.

17. In combination, a main valve having a diaphragm and a pressure chamber above said diaphragm; a pilot valve for controlling the supply of operating fluid to said pressure chamber; means for conducting fluid under pressure from the inlet chamber of said main valve to said pilot valve; means in said main valve including an element connected with said diaphragm for varying the rate of supply of pressure fluid to said pilot valve to control the rate of closing of the main valve; and an exhaust passage for spent operating fluid connected with said pilot valve, said exhaust passage including means for restricting the rate of flow therethrough, whereby the rate of opening of the main valve may be controlled.

18. A valve comprising: a body having an inlet opening and an outlet opening; valve means for controlling the flow between said openings; a diaphragm and a valve stem connected with said valve means; a pressure chamber above said diaphragm; a plurality of guiding means for said valve stem, one of said guiding means being located above said pressure chamber and another of said guiding means being located in one of said openings; passage means for conducting fluid under pressure from one of said openings to said pressure chamber; and means associated with said valve stem arranged to control the flow of operating fluid to said pressure chamber, whereby to control the rate of closing of the valve.

19. A valve comprising: a body having an inlet opening and an outlet opening; valve means for controlling the flow between said openings; a diaphragm and a valve stem connected with said valve means; a pressure chamber above said diaphragm; a plurality of guiding means for said valve stem, one of said guiding means being located above said pressure chamber and another of said guiding means being located in one of said openings; passage means for conducting fluid under pressure from one of said openings to said pressure chamber; and means associated with said valve stem arranged to control the flow of operating fluid to and from said pressure chamber, whereby to control the rate of closing and opening of the valve.

20. In combination, a fluid operated valve having a pressure chamber arranged to receive fluid for actuating said valve; a pilot valve for controlling the supply of operating fluid to, and the exhaust of spent operating fluid from, said pressure chamber; and means between said pilot valve and said pressure chamber for controlling the rate of admission of operating fluid into, and the rate of exhaust of spent operating fluid from, said pressure chamber, said means being arranged and constructed so that the valve may be closed at a non-uniform rate and opened at a relatively reversed non-uniform rate.

21. In combination, a fluid operated valve having a pressure chamber arranged to receive fluid for actuating said valve; a pilot valve for controlling the supply of operating fluid to, and the exhaust of spent operating fluid from, said pressure chamber; and a member operatively associated with said pilot valve and said pressure chamber for controlling both the rate of admission of operating fluid into and the rate of exhaust of spent operating fluid from, said pressure chamber, said member being arranged and constructed so that the valve will start to close at a rapid rate and finally close at a relatively slower rate, and will start to open at a slow rate and finally open at a relatively faster rate.

22. In combination, a main valve having a diaphragm and a pressure chamber above said diaphragm; a pilot valve for controlling the supply of operating fluid to said pressure chamber; means for conducting fluid under pressure from the inlet chamber of said main valve to said pilot valve; and means in said main valve including an element connected with said diaphragm for varying the rate of supply of pressure fluid to said pilot valve to control the rate of closing of the main valve.

DONALD G. GRISWOLD.